Feb. 21, 1961  E. H. SIEGLER, JR., ET AL  2,972,277
DISPERSION PRISMS
Filed June 24, 1957  2 Sheets-Sheet 1

INVENTORS
HAMILTON W. MARSHALL, JR.
E. HORACE SIEGLER, JR.
BY
ATTORNEY

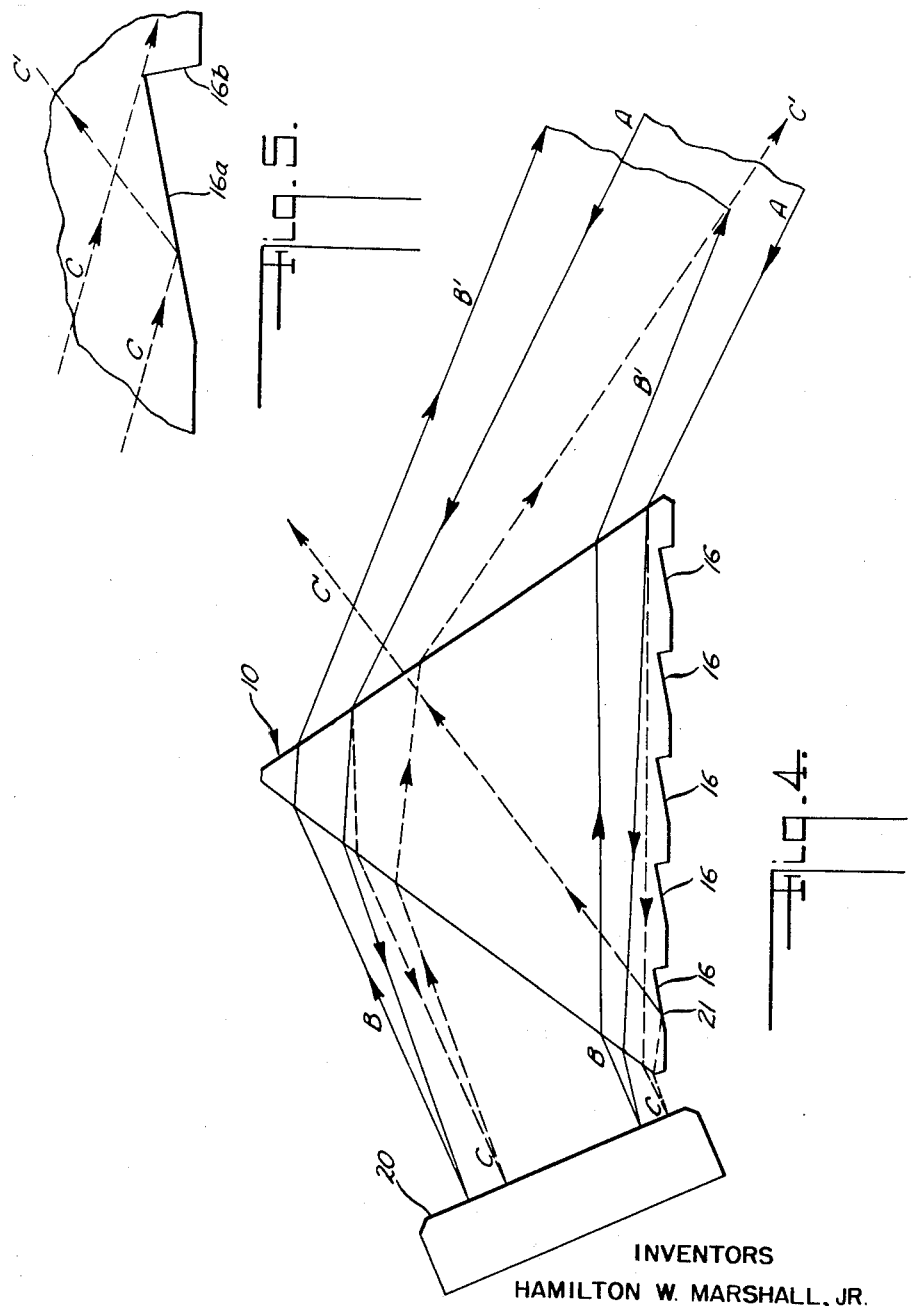

United States Patent Office 2,972,277
Patented Feb. 21, 1961

2,972,277

DISPERSION PRISMS

Edouard Horace Siegler, Jr., Darien, and Hamilton W. Marshall, Jr., East Norwalk, Conn., assignors to The Perkin-Elmer Corporation, Norwalk, Conn., a corporation of New York Filed June 24, 1957, Ser. No. 667,452

3 Claims. (Cl. 88—1)

The present invention concerns an optical element of novel construction which reduces unwanted radiation passing therethrough. More particularly, the present invention takes the form of a prism for dispersing radiant energy which, because of its unique configuration, is capable of deflecting stray unwanted radiation out of the principal path of the dispersed radiant energy.

Various specific forms and shapes of prisms are utilized in optical systems to redirect radiant energy in one sense or another. Typical use of a prism may be to utilize its properties of total internal reflection as a corner prism, for instance, which will perform the function of redirecting a beam of visible light on a path generally opposite to the path by which the beam reaches the prism.

Prisms also perform the function of dispersing radiant energy of one kind or another. Glass prisms are used to disperse visible light. Dispersion prisms of other materials, such as sodium chloride, lithium fluoride, calcium fluoride, potassium bromide, and caesium iodide may be used to disperse infrared radiant energy. The selection of an appropriate material for a prism depends largely upon its ability to transmit the particular wavelengths of radiant energy which are to be operated upon in an optical system.

For instance, sodium chloride is used to transmit infrared energy generally within the 2.5 micron to 15 micron wavelength region. Sodium chloride prisms, as used in the infrared arts, are shaped and polished to a smoothness comparable to that of glass and, generally speaking, such prisms can be made to act upon infrared energy (within the spectral limits noted) much in the same fashion that glass prisms act upon visible light.

However, in optical systems utilizing infrared energy, a selected wavelength spectrum is often scanned so that at any particular instant the "wanted" radiation comprises a narrow wavelength band. It is also true that in many instruments and systems which utilize infrared energy, the detectors which ultimately provide the output signal of the system are the type known in the art as nonselective detectors. That is to say that this category of detectors will produce a signal commensurate with all the radiant energy which they "see" within rather broad spectral limits. In such a system, it is therefore most important that the remainder of the system be highly selective of the wavelength of radiant energy which reaches the detector so that certain information may be properly correlated, such as the relation of wavelength of the radiant energy transmitted through the system at a given instant to the amount of energy absorbed. A major source of error is stray, unwanted wavelengths of radiation which become mixed with the selected and desired wavelengths of radiation. The detector cannot discriminate the unwanted radiation from the wanted radiation which bears useful information, and the amount of unwanted radiation therefore becomes an error factor unless it is eliminated before it reaches the detector.

In infrared systems the shorter wavelengths of stray energy are of particular concern because the energy distribution of many infrared sources is such that a significantly greater amount of energy is emitted at the shorter wavelengths than at the relatively longer wavelengths of infrared radiant energy. Thus, when the wanted radiation containing useful information is of the longer wavelengths, a comparatively small percentage of the shorter wavelength stray radiation can be a major error factor because of its initially greater intensity. Conversely, the stray radiation of wavelengths longer than those of the wanted radiation are less troublesome because of their generally weaker initial intensity at the infrared source.

The dispersing prism of the present invention acts upon unwanted stray radiation so that it is partially absorbed and the remainder is deflected out of the principal path of the wanted dispersed radiation. This is accomplished by serrating a face of the prism and coating the serrations with an energy absorbing material. The particular configuration of the serrations, their placement, and angular disposition on the prism, as well as their relation to the principal path of the radiant energy which enters the prism through one face and emerges in dispersed form through another face, will be more readily appreciated from an understanding of the following description of a typical embodiment of the invention as shown in the drawings in which:

Fig. 4 is a diagrammatic view of a typical embodiment of the present invention and its action upon a beam of radiant energy such as might be employed in an infrared optical system; and Fig. 5 is an enlarged view of a portion of the serrated face of the prism illustrated in Fig. 4.

Figure 1:
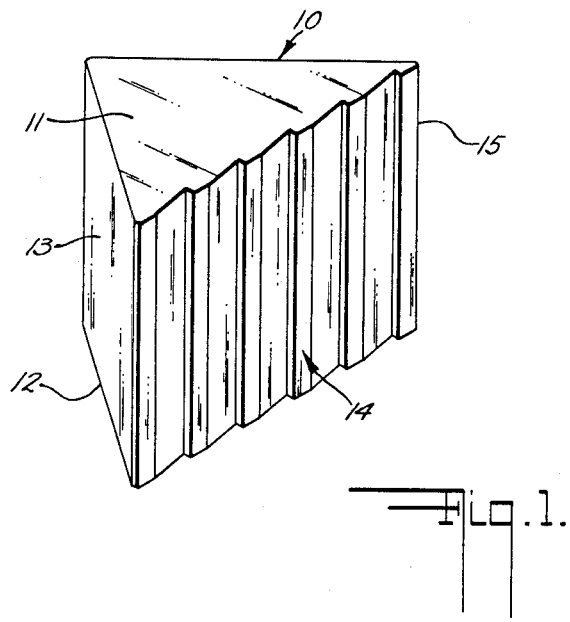
Fig. 1 is an isometric view of a prism embodying the present invention.

As is seen from the perspective illustration of Fig. 1, the prism 10 of the present invention is generally triangular in shape, having parallel ends, 11 and 12, and three faces, 13, 14, and 15, each of which is of rectangular form. One of the three faces, 14, is serrated, the direction of the serrations being normal to the base of the prism 12. Thus, when the prism 10 is placed in the path of radiant energy which enters through one of the planar faces 13 and emerges through the other planar face 15 in dispersed form, the principal path of the beam through the prism 10 of Fig. 1 is in a direction normal to the principal axis of the serrations on the face 14.

In accordance with the concept of the present invention, the serrations in the prism need not be normal to the principal path of the radiant energy passing through the prism, nor is it necessary that the serrations be parallel straight cuts in the side of the prism as illustrated in the embodiment of Fig. 1. These serrations may, for instance, be disposed at an appropriate angle to achieve such particular result as may be desirable in a given optical system and the concept, objects, and features of the present invention may be achieved by appropriate curvilinear serrations cut into the face of a prism in the form of concentric arcuate cuts. In many applications, however, linear serrations which are orthogonally disposed in relation to the principal path of the radiant energy through the prism will be found to be convenient and suitable.

Figures 2, 3:
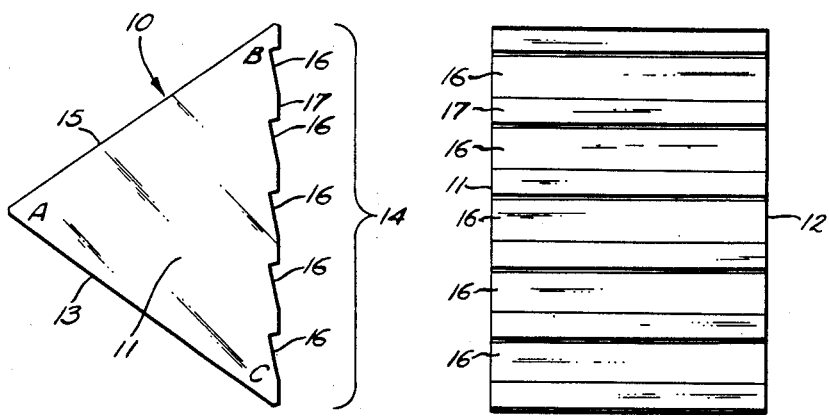
Fig. 2 is a cross-sectional view of the prism of Fig. 1.
Fig. 3 is an elevational view of the serrated face of the prism of the present invention.

The cross section of a typical embodiment of the present invention used as a dispersing prism in an infrared spectrophotometer may be substantially as shown in Fig. 2. This particular prism has a cross section which is an isosceles triangle including one angle A of 70 degrees and two angles B and C of 55 degrees. The larger face of the prism 14 is serrated by a plurality of angular cuts 16 made in its planar face 14 as shown in Fig. 3. It is not necessary that the present invention have a cross-sectional configuration of an isosceles triangle, but many dispersion prisms are substantially so formed and the embodiment of Figs. 1, 2, and 3 is typical.

The dimensions of a typical prism of the present invention as shown in Figs. 1, 2, and 3 are 77 mm. along the larger face 14, the height of the triangular section being 54 mm., considering the larger face 14 as the base of the triangle. The serrations are made at intervals of 14 mm., leaving a flat part 17 of the planar face 5 mm. long adjacent each serration 16. The cut which forms the serration is made at an angle of 12 degrees to the plane of the larger face and the adjacent areas formed by each serration cut itself are at an angle of 90 degrees to each other. The particular embodiment shown in Figs. 1, 2, and 3 is 55 mm. in height from its base to its top.

The smaller faces 13 and 15 of the prism 10 illustrated in the drawings are polished optically flat, while the base 12 of the prism is fine ground in order to provide a reference for positioning the prism in the optical system. The top of the prism 11 is string-cut so as to leave a somewhat rough or irregular surface as compared to the optically polished faces 13, 15 and the fine ground base 12 of the prism. No attempt is made to polish the serrations 16 of the prism, but rather the entire serrated face 14 is left with a comparatively rough finish similar in appearance to a ground glass surface, and the entire serrated face 14 is covered with a suitable black coating, such as flat, black paint of the type customarily used in cameras, so as to enhance the absorptive qualities of the serrated face 14.

Fig. 4 illustrates the manner in which the particular configuration of the present invention functions so as to greatly reduce the stray and unwanted radiation in the principal path of the wanted dispersed radiation. Sound optical design requires that some limitation, such as an optical stop, be included in an optical path so that the radiation reaching a dispersion prism is confined within the defined limits of a beam. Such a beam is illustrated in Fig. 4 as being within the limits of the solid lines A—A shown with arrows indicating the direction of travel of the beam. Thus, the radiant energy is directed to the prism from right to left as indicated in Fig. 4. When the radiant energy beam A—A strikes the prism 10, it is refracted in accordance with the difference of the refractive index media through which it is passing, i.e., in this case the media may be air and a suitable prism material, such as sodium chloride, for instance. The refraction occurs in varying degrees in such a manner that the longer wavelengths of radiation are refracted at a lesser angle than the shorter wavelengths of radiation contained in the beam and thus, by passing the radiant energy through the prism, the different wavelengths of radiation in the beam are caused to be dispersed in accordance with their respective wavelengths. The wanted wavelengths of radiation passing through the prism may strike a reflecting means 20 in a typical system and are returned to pass once again through the prism 10 along the principal path of the dispersed radiant energy as indicated by the arrows of the solid lines B—B which point in a right-to-left direction.

Both the shorter and longer wavelength components of a typical beam of radiant energy are contained within the same bundle of energy so that the beam entering the prism A—A shows no separation of the various components. After the radiant energy beam has entered the prism 10, however, the separation of the various wavelength components of the beam is effected in the course of the dispersion. For purposes of illustration, the paths of the shorter wavelengths are illustrated by broken lines C—C. These comparatively shorter wavelengths C—C of radiant energy comprise a large portion of unwanted stray radiation of many infrared optical systems.

The shorter wavelengths contained in the upper extremities of the radiant energy beam entering the prism 10 are seen to be refracted at a greater angle than the remainder of the beam. As illustrated by the broken lines, these shorter wavelengths emerge from the prism and strike a reflecting means 20 such as a Littrow mirror. They are reflected back into the prism again, are refracted a second time, and emerge from the prism at C' at an angle such that they are directed out of the principal path of the wanted dispersed energy B'—B' of the beam. As is apparent from the illustration of Fig. 4, a detector may be placed at a point where it will receive all the "wanted" radiation within the limits of the beam defined by B'—B', but yet receive none of the unwanted stray radiation of shorter wavelengths.

Shorter wavelengths of radiation contained in the lower portion of the beam of radiant energy enter the prism and are similarly refracted at a different angle from the wanted wavelengths of radiant energy, and emerge from the prism to be reflected by the Littrow mirror back through the prism. Because of the additional refraction upon second passage through the prism, some of these shorter wavelengths of stray radiation strike the lower face 14 of the prism. It will be recalled that the serrated face 14 of the prism 10 is covered with a coating which is capable of absorbing a major portion of the shorter wavelengths of energy which are incident thereon, such as is allustrated at 21. That amount of energy contained in the undesired shorter wavelengths which is not so absorbed is deflected, as shown at C', out of the principal path of the wanted dispersed energy B'—B' by the particular configuration of the serrations 16.

Each serration 16 is comprised of two adjacent areas or facets which form the cut in the planar face of the prism 10. The larger facet of the serration performs the function of intercepting the shorter wavelengths of unwanted, stray radiation in the lower portion of the beam of radiant energy, absorbing part of the unwanted shorter wavelengths and deflecting out of the principal path of the wanted radiant energy that amount of the unwanted radiation which is not so absorbed. The smaller adjacent facet of each serration also performs a function which will be explained more fully hereinafter. It should be noted that the major facet of each serration cut is so disposed that the angle of incidence of the shorter wavelengths striking that portion of each serration are reflected out of a planar face of the prism at an angle as illustrated at C' which permits very little internal reflection.

Fig. 4 illustrates by the broken lines the manner in which the unwanted shorter wavelengths C in the extreme lower portion of the beam are operated upon to be eliminated from the principal path B'—B' of the dispersed energy which emerges from the prism. It would be possible to make a single serration on the face 14 of a prism to effect substantially the same results which are achieved by the plurality of serrations 16 illustrated in the drawings. The plurality of serrations 16 is more economical, however, of prism material in that each serration need not be cut as deeply into the prism material as would be necessary with but a single serration.

Unwanted shorter wavelengths of radiant energy contained in portions of the beam adjacent to those shown by the lowermost broken lines C will be acted upon by the several serrations 16 which are cut into the lower face 14 of the prism. By proper placement of the several serrations 16 and selection of an appropriate angle, the shorter unwanted wavelengths of stray radiation are directed out of the prism at an angle which minimizes internal reflection and, therefore, substantially precludes the stray radiation being reflected by the prism internally through several reflections to finally emerge in the path B'—B' of the wanted dispersed radiant energy.

Although an optical stop may be customarily employed to confine radiant energy within the limits of a desired beam, the detector to which the dispersed radiant energy is directed is often related to the remainder of the optical system in such a way that it effectively "sees" the entire prism 10 including the serrated face 14 as shown in Fig. 4. It is highly desirable and most important that the detector should not receive radiant energy within the principal emergent path B'—B' which does not include the serrated face 14 of the prism. The present invention operates to effect this result by having the second or smaller facet of each serration so disposed with relation to the larger facet of the serration and the incident angle of the stray radiation that the smaller facet of each serration is optically shaded by the larger area.

This relationship is illustrated in Fig. 5 which is an enlarged partial view of Fig. 4. As in Fig. 4, the unwanted stray radiation is represented by broken lines C and C' and, as has previously been explained, that stray radiation C which is incident upon a larger serration facet 16a is partially absorbed, the remainder C' being reflected out of the principal path of the wanted radiant energy. Because of the angular relationship of the shorter unwanted wavelenths of stray radiation, it is impossible for the smaller facet 16b of the serration 16 to be irradiated by the shorter unwanted wavelengths of radiation C; neither can the longer wavelengths B—B of radiation irradiate the smaller facet 16b of each serration 16 because of its angular disposition. Thus, the detector which is positioned to receive dispersed energy from the entire prism 10, including the serrated face 14, "sees" the serrations 16, the smaller facets 16b of which are presented to the detector as black, unilluminated areas. The detector does not see the larger facets 16a of the serrations 16.

As may be seen from Fig. 5, it is possible that the smaller facet 16b of a serration 16 be disposed at a number of angles which will effect the desired result in accordance with the teaching of the present invention. There is, however, a limit to the angle of the smaller facets 16b of each serration 16 beyond which the desirable result described above cannot be best achieved. This limit is primarily dependent upon the angle of incidence of the shorter wavelengths C of stray radiation, as well as the depth and angle of the larger facet 16a of the serration 16.

In the embodiments illustrated herein, the smaller facet 16b of each serration 16 is illustrated as being disposed at a right angle to the larger facet 16a of each serration 16. Serrations comprised of the two facets 16a, 16b so angularly disposed effectively achieve the desired results in accordance with the concept and teaching of the present invention, and the illustrated serrations 16 are conveniently cut into the prism 10 by an apparatus which produces a 90-degree angle included between the facets 16a and 16b.

It should be borne in mind that the placement and angular disposition of the serrations for the particular embodiment of the present invention shown in Figs. 1, 2, and 3 are illustrative examples only and that the preferred placement of the serrations as well as their angular disposition is dependent upon a number of factors including the wavelengths contained within the radiant beam being operated upon by the prism, the material of the prism itself (and, more particularly, its refractive index), the difference in refractive index at the boundary of the media through which the beam passes, and the particular geometrical shape of the prism.

All of these factors bear upon the most advantageous placement and the angular disposition of serrations to be made in accordance with the teaching of the present invention. Moreover, the present invention may be embodied in a wide variety of optical elements of prismatic form which, as will be apparent to those skilled in the art, need not be of the particular triangular cross section disclosed herein. The triangular prism disclosed was chosen for illustrative purposes by reason of its being one of the simplest and most readily understandable embodiments of the present invention.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

We claim:

1. A prism for dispersing radiant energy, said prism having a first flat face through which said energy enters, a second flat face through which said energy emerges in dispersed form, and a base surface contiguous to both said first and second faces and having serrations therein each of said serrations comprising a first and second facet, the first facet of said serrations being parallel to each other, the angular disposition of said serrations being such that stray radiation of relatively short wavelengths impinging thereon is deflected to the surface of a face of the prism at an angle less than the critical angle of incidence whereby said relatively shorter wavelengths are deflected out of the path of the incident beam.

2. A prism for dispersing radiant energy, said prism having a first face through which said energy enters, a second face through which said energy emerges in dispersed form, and a base surface contiguous to both said first and second faces and having serrations therein, each said serration being comprised of first and second adjacent facets being disposed at 90° to each other, said first facets being angularly disposed for reflecting relatively short wavelengths of the incident radiation to the surface of a face of the prism at an angle less than the critical angle of incidence, and said second facet of each serration being angularly disposed so as to be shaded by the said first facet from the incidence of unwanted stray radiation thereon whereby shorter wavelengths are refracted at a prism face and deflected out of the path of the incident beam.

3. A prism as defined in claim 2 wherein said base surface is coated to absorb stray radiation impinging thereon.

References Cited in the file of this patent

UNITED STATES PATENTS

| | | |
|---|---|---|
| 2,073,773 | Andres | Mar. 16, 1937 |
| 2,447,828 | West | Aug. 24, 1948 |
| 2,654,287 | Luft | Oct. 6, 1953 |

FOREIGN PATENTS

| | | |
|---|---|---|
| 416,509 | Great Britain | Sept. 17, 1934 |